Patented Nov. 6, 1945

2,388,606

UNITED STATES PATENT OFFICE 2,388,606

PRODUCTION OF SECONDARY AMINES FROM NITROGEN COMPOUNDS

William S. Emerson, Dayton, Ohio

No Drawing. Original application December 16, 1940, Serial No. 370,355. Divided and this application September 15, 1944, Serial No. 554,329

8 Claims. (Cl. 260—577)

The present invention relates to the reductive alkylation of amines, nitro, nitroso and azo compounds by means of aldehydes or ketones and hydrogen gas in the presence of a hydrogenation catalyst. The invention relates particularly to alkylation in the nitrogen-containing radical of the amino, nitro, nitroso or azo compound to produce N-alkyl or N-aralkyl substituted amines. The invention also relates to methods of controlling the proportion of secondary and tertiary amines produced in such reactions and is specifically directed to the production of secondary and tertiary amines.

The principal objects of the present invention are to provide a simple and economical method of obtaining N-alkylated or N-aralkylated amines by the reduction with hydrogen of an aldehyde or a ketone and an amine, nitro, nitroso, or azo compound or an intermediate condensation product of the specified carbonyl compounds and one of the nitrogen compounds. Another object of the invention is to provide a method of such reductive alkylation of nitrogen compounds whereby the yield of secondary N-monoalkylated or tertiary N-dialkylated amines may be controlled to the extent of suppressing or entirely eliminating the formation of the undesired alkylated amines. Other objects and advantages of the invention, some of which are specifically referred to hereinafter, will be apparent to those skilled in the art.

This application is a division of my copending application S. N. 370,355, filed December 16, 1940. In my application S. N. 332,975, filed May 2, 1940, now issued as U. S. Pat. 2,298,284, of which my copending application S. N. 370,355, filed December 16, 1940, is a continuation-in-part, I have disclosed that by reducing a mixture of an aldehyde and a nitro or amino compound with hydrogen in the presence of a platinum or Raney nickel reduction catalyst under neutral or slightly alkaline reaction conditions, secondary amines are formed while the simultaneous formation of tertiary amines is suppressed or entirely avoided. Such neutral or slightly basic or alkaline conditions are obtained by placing in the reaction mixture undergoing hydrogenation an alkali-metal salt of a weak organic acid such as sodium acetate, sodium carbonate, sodium stearate or the like. I have also shown in my copending application and in my application S. N. 332,975, that if acid conditions are maintained in a similar reaction mixture, for example, by the presence of trimethylamine hydrochloride in the reaction mixture, tertiary amines are formed to the exclusion or suppression of secondary amines.

I have discovered that in such reductive alkylations with nitrogen compounds and carbonyl compounds, that neutral or slightly basic reaction conditions maintained by the addition of sodium acetate or other alkali-metal salts of weak organic acids favor the formation of secondary amines while acid conditions maintained by the addition of trimethylamine hydrochloride, acetic acid or the like, favor the formation of tertiary amines.

Although I refer to neutral or basic and acid conditions or media throughout this specification, it is not to be understood that acidity or alkalinity in and of itself is directly responsible for the improvements specified. Sodium acetate, acetic acid or trimethylamine hydrochloride do change the pH or hydrogen-ion concentration of the reaction mixture, but they probably act by virtue of their ability to favor certain condensation reactions or the like rather than as a result of their acidity. Sodium hydroxide, for example, which produces alkaline media, hinders reaction. Hence it is to be understood that when acid or basic media or conditions are referred to, these terms are used merely for convenience to classify the various kinds of condensing agents which are added to the reaction mixture.

When the carbonyl compound used in such reactions is a ketone instead of an aldehyde, somewhat more drastic reaction conditions, such as higher temperatures, are necessary to produce secondary amines in neutral or slightly basic media. Ketones do not yield tertiary amines in neutral or slightly basic media. In acid media, on the other hand, ketones yield secondary instead of tertiary amines, even under drastic reaction conditions such as elevated temperatures of reaction and concentrated acid.

I have also discovered that besides amines and nitro compounds, other nitrogen compounds such as nitroso and azo compounds, for example, nitrosobenzene and azobenzene, may be used in the reactions. Furthermore, I have found that substituents such as hydroxyl and amino radicals in the nitrogen compound have an activating effect on the reaction. Thus, when an aromatic nitrogen compound contains an amino or a hydroxyl group ortho, or particularly, para, to the nitro, amino, nitroso or azo group, the reductive alkylation of such substituted compound with ketones progresses more rapidly to the formation of secondary amines while with aldehydes, reaction is also accelerated and tertiary amines are formed in either basic or acid media. Alkyl groups substituted in the benzene ring also have a mild activating influence which is less pronounced than that of amino or hydroxyl groups, however. In the case of azo compounds, hydroxy or dimethylamine groups, either ortho or para to the azo group, have an activating influence and tertiary amines are formed in alkaline or acid media.

The methods of adopting the present discoveries and those of my copending application, S. N. 370,355, and my application, S. N. 332,975, to the production of secondary or tertiary amines by reductive alkylation are set forth in the examples which follow hereinafter, but may be briefly summarized as follows:

A. Secondary amines may be made by the reaction of hydrogen in the presence of a hydrogenation catalyst on a reaction mixture comprising:
   1. An unsubstituted nitrogen compound (nitro, amino, nitroso or azo compounds) or such a nitrogen compound free from activating substituents such as amino or hydroxyl groups in the ortho or para position, together with an aldehyde, in an alkaline medium (activating substituents favor the formation of tertiary amines), or
   2. A nitrogen compound containing activating substituents together with a ketone in an acid medium, or less favorably, in an alkaline medium, or
   3. An unsubstituted nitrogen compound or a nitrogen compound free from activating substituents, as in 1, together with a ketone in an acid medium or in an alkaline medium under more drastic reaction conditions.
B. Tertiary amines may be made by the reaction of hydrogen in the presence of a hydrogenation catalyst on a reaction mixture comprising:
   1. A nitrogen compound (nitro, amino, nitroso or azo compound), with or without activating substituents, together with an aldehyde in acid media, or
   2. A secondary amine together with an aldehyde in an acid medium.

Ketones are inactive or are not as reactive as aldehydes in the formation of tertiary amines, either in acid or alkaline media, even under drastic reaction conditions. They may be advantageously used, however, in the production of secondary amines in accordance with the processes summarized above, especially when used in an acid instead of an alkaline medium. The reaction of primary aromatic amines with aldehydes, particularly formaldehyde, in acid media, is complicated by the formation of tarry condensation products of the type of anhydroformaldehyde-aniline and the like and hence, to avoid such formation of condensation products, resort should be made to primary aromatic nitro compounds or the like as starting materials; such condensation products do not readily form between primary aromatic amines and ketones or secondary aromatic amines and either aldehydes or ketones and hence reaction mixtures containing these compounds may be used. When formaldehyde is used in any reaction mixture under acid conditions complications are also likely to result from polymerization of the formaldehyde. These complications do not result with acetaldehyde or higher aldehydes when used in the acid reaction mixtures contemplated by the present invention, however. The reductive alkylation product of formaldehyde and primary aromatic amines, furthermore, is a tertiary amine, in many cases, even in alkaline reaction media.

The yields in the foregoing alternative processes for the production of secondary or tertiary amines vary somewhat and hence one will be preferable to another. The processes also differ in the proportion of secondary or tertiary amines which are formed. By using ketones to prepare secondary amines, for example, it is possible to operate in such a manner that no substantial proportion of tertiary amine is formed as a by-product, which may be highly desirable, whereas in a reaction where the tertiary amine is the desired product it may be more economical to adopt an alternative which gives a high yield of tertiary amine that may be contaminated with small proportions of secondary amines in preference to one which gives a small yield of tertiary amine uncontaminated with secondary amines, since secondary amines can be converted in a separate subsequent step to tertiary amines.

It is known that secondary and tertiary amines have been prepared by reductive alkylation by the use of nascent hydrogen generated in situ from the reaction of a metal and an acid or by the use of hydrogen gas in the presence of a nickel catalyst at high temperatures (50° to 200° C.) and under high pressures (50 to 150 atmospheres). That such reactions could be conducted with hydrogen gas in the presence of a hydrogenation catalyst under relatively mild reaction conditions (room temperature and pressures of about 2 to 4 atmospheres) by the use of the specified acids or salts which modify the acidity (pH or hydrogen-ion concentration) of the reaction medium and serve as condensing agents or modify the reaction in some other manner, was unexpected.

By means of the processes of the invention it has been possible to prepare in an advantageous manner amines which have not been heretofore prepared or which could not be prepared by heretofore known methods. Since the methods disclosed herein show how alkylation may be stopped at the formation of the secondary amine the methods are useful for the preparation of tertiary amines having two different alkyl substituents on the amino nitrogen atom in an advantageous manner.

In the examples which follow, typical methods of practicing the processes of my invention are set forth:

*Example I.—N-ethylaniline using acetaldehyde and alkaline conditions*

Into an apparatus for catalytic reduction, preferably provided with a stirrer or means for shaking, are placed 93 grams (about 1 mol) of aniline dissolved in 1500 cc. of 95% ethyl alcohol and about 88 grams (about 2 mols) of acetaldehyde, 10 to 20 grams of fused sodium acetate, and about 30 grams of Raney nickel catalyst, which may be prepared by the method of Covert and Adkins described in the Journal of the American Chemical Society, 1932, vol. 54, page 4116. Other methods of preparing Raney nickel catalysts are described in U. S. Patents 1,563,587; 1,628,190; 1,915,473; and 2,139,602. The apparatus is evacuated and then an initial pressure of about 3 atmospheres (45 lbs. per square inch) of hydrogen is applied. The apparatus is maintained at room temperature and the hydrogen is maintained at a pressure of about 3 atmospheres during absorption thereof. After hydrogen is no longer absorbed, which may be after an hour or more depending upon the rate of absorption, the reduction is stopped and the catalyst is removed by filtration. The solution is acidified slightly and the alcohol is distilled off. The remaining oil is then made slightly alkaline and fractionated, under vacuum if desired. N-ethylaniline has a distilling point of 204° C. The yield is about 58% of the theoretical, based on the aniline used.

*Example II.—N-n-heptylaniline using heptaldehyde and alkaline conditions*

By proceeding as in Example I, using from 2 to 5 mols of heptaldehyde instead of acetaldehyde and fractionating the product in vacuum, N-n-heptylaniline is obtained.

N-n-heptylaniline has a boiling point of 125° to 130° C. at a pressure of 30 mm., a specific gravity of 0.906 at 20°/20° C. and a refractive index at 20° C. of 1.5080 for the sodium D line.

*Example III.—N-n-butyl-alpha-naphthylamine using butyraldehyde and alkaline conditions*

By proceeding as in Example I but substituting butyraldehyde for acetaldehyde and alpha-naphthylamine for aniline in molecular proportions, and fractionating the product in vacuum, N-n-butyl-alpha-naphthylamine is obtained in 80% of the theoretical yield.

The new compound, N-n-butyl-alpha-naphthylamine, has a boiling point of 155° to 167° C. at a pressure of 8 mm., a specific gravity of 1.004 at 20°/20° and a refractive index of 1.5963 at 20° C. for the sodium D line. Its hydrochloride melts at 151° to 152° C.

*Example IV.—N-ethyl-p-anisidine using acetaldehyde and alkaline conditions*

By proceeding as in Example I but substituting p-anisidine for aniline in molecular proportions and fractionating the product, N-ethyl-p-anisidine is obtained in 51% yield.

N-ethyl-p-anisidine has a boiling point of 135° to 140° C. at a pressure of 20 mm., a specific gravity of 1.017 at 20°/20° and a refractive index of 1.5444 at 20° C. for the sodium D line. Its para-bromobenzenesulfonamide melts at 113° to 114° C.

*Example V.—N-n-butyl-p-anisidine using butyraldehyde and alkaline conditions*

By substituting butyraldehyde for acetaldehyde in molecular proportions in Example IV and proceeding as therein described, N-n-butyl-p-anisidine is obtained in 65% yield.

This new compound, N-n-butyl-p-anisidine, has a boiling point of 142° to 145° C. at a pressure of 6 mm., a specific gravity of 0.963 at 20°/20° and a refractive index of 1.5207 at 20° C. for the sodium D line. Its hydrochloride melts at 187.5° to 188° C.

*Example VI.—N-n-butylaniline from nitrobenzene and butyraldehyde under alkaline conditions*

Into an autoclave provided with a stirrer are placed 123 grams (about 1 mol) of freshly distilled nitrobenzene, 20 grams of fused sodium acetate, 1500 cc. of 95% ethyl alcohol, 94 grams (about 1.3 mol) of freshly distilled n-butyraldehyde and 30 grams of Raney nickel catalyst. The autoclave is evacuated and thereafter an initial pressure of 3 atmospheres of hydrogen is applied to the autoclave and the mixture is maintained at room temperature. After about 4 mols of hydrogen have been absorbed, the reduction is stopped and the catalyst is removed by filtration or decantation. The filtrate is made slightly acid with hydrochloric acid and the alcohol is distilled off. The residue is then diluted with about 1000 cc. of water and made slightly alkaline with sodium hydroxide. It may be subsequently extracted with ether and the extracts combined and after evaporation of the ether, fractionally distilled. However, the original residue without dilution with water may be made basic and then subjected to vacuum distillation. The product, N-n-butylaniline, is obtained in a yield of about 77% to 81% of the theoretical and has a boiling point of 235° to 245° C.

*Example VII.—N-di-n-butyl-p-aminophenol from p-nitrophenol and butyraldehyde under alkaline conditions*

When p-nitrophenol is substituted in Example VI for nitrobenzene and butyraldehyde is present in excess, the product obtained is substantially all N-di-n-butyl-p-aminophenol. It is difficult to get any yield of secondary amine in this reaction because of the presence of the activating hydroxyl group in the para position.

*Example VIII.—p-chloro-n-butylaniline from p-chloronitrobenzene and butyraldehyde under alkaline conditions*

By substituting p-chloronitrobenzene for nitrobenzene in molecular proportions in Example VI, the product obtained consists of unalkylated p-chloroaniline, a fraction boiling at 105° to 145° C. at 25 mm., consisting of n-butylaniline and p-chloro-n-butylaniline, and higher boiling fractions in which occurs p-chloro-n-butylaniline.

The yield in this case indicates that chlorine-substituents have no activating influence since the yield is substantially identical with that obtained when nitrobenzene is reacted under the same conditions. The lack of activating influence of the chlorine is shown more than anything else by the presence of unalkylated p-chloroaniline in the reaction mixture.

*Example IX.—N-di-n-heptyl-p-toluidine from p-nitrotoluene and heptaldehyde under alkaline conditions*

By substituting heptaldehyde for butyraldehyde and p-nitrotoluene for nitrobenzene in molecular proportions in Example VI and proceeding as therein otherwise described, N-mono-n-heptyl-p-toluidine and N-di-n-heptyl-p-toluidine are obtained, the latter in a yield of 34% of the theoretical. The latter compound, N-di-n-heptyl-p-toluidine, is a new compound and has a boiling point of 175° to 200° C. at a pressure of 2.5 mm., a specific gravity of 0.943 at 20°/20° and a refractive index of 1.5089 at 20° C. for the sodium D line. Its hydrochloride melts at 136° C. The methyl group of the nitrotoluene has a mild activating influence, the formation of both secondary and tertiary amines being a result thereof.

*Example X.—N-ethylaniline using acetaldehyde, alkaline conditions and platinum catalyst*

By substituting 2 grams of a platinum oxide catalyst prepared according to the method of Adams, Voorhees and Shriner ("Organic Syntheses," coll. vol I, 1932, page 452) for the Raney nickel catalyst and proceeding otherwise as in Example I, N-ethylaniline is obtained in a yield of 41% of the theoretical.

*Example XI.— N-benzyl-alpha-naphthylamine using benzaldehyde and alkaline conditions*

By substituting benzaldehyde for acetaldehyde and alpha-naphthylamine for aniline in molecular proportions in Example I and proceeding as otherwise therein indicated, benzylalpha-naphthylamine is obtained. Its benzamide has a melting point of 103° to 104° C.

Table I.—*Reductive alkylation of nitrobenzene with butyraldehyde in media of varying acidities*

The effect of various of the added agents and acidity engendered by their use, as well as the influence of other factors, is illustrated in the following results. In these tests, the specified quantity of butyraldehyde was reacted with 0.10 mol of nitrobenzene in the presence of 3 grams of Raney nickel catalyst. The pH represents the acidity of the reaction mixture as observed on a Hellige pH meter. The yields are expressed as per cent of secondary (N-n-butylaniline) and tertiary amines (N-di-n-butylaniline) respectively.

| Run | Mols hydrogen absorbed | Mols butyraldehyde present | Solvent | Condensing agent | pH | Per cent yield | |
|---|---|---|---|---|---|---|---|
| | | | | | | Secondary amine | Tertiary amine |
| 1 | 0.56 | 0.30 | Alcohol | 2 g. sodium acetate | 8.81 | 92 | |
| 2 | 0.42 | 0.10 | do | do | 8.81 | 74 | |
| 3 | 0.42 | 0.12 | do | do | 8.81 | 77 | |
| 4 | 0.39 | 0.13 | do | do | 8.81 | 74 | |
| 5 | 0.44 | 0.13 | do | do | 8.81 | 81 | |
| 6 | 0.40 | 0.13 | Dioxane | do | 7.41 | 74 | 12 |
| 7 | 0.41 | 0.13 | Alcohol | 2 g. trimethyl amine hydrochloride | 4.73 | | 63 |
| 8 | 0.42 | 0.13 | do | 2 g. sodium formate | 8.44 | 47 | 15 |
| 9 | 0.41 | 0.13 | do | 2 g. sodium carbonate | 9.22 | 27 | 20 |
| 10 | 0.43 | 0.13 | do | 5 cc. 40% trimethylamine | 9.95 | 30 | 15 |

*Example XII.—N-di-n-butylaniline using nitrobenzene, acid conditions and platinum catalyst*

Into the pressure bottle of a machine for catalytic reduction is placed a solution of 12.3 grams (0.1 mol) of nitrobenzene, 21.6 grams (0.3 mol) of butyraldehyde and 10 cc. of glacial acetic acid in 150 cc. of 95% ethyl alcohol. To this solution was then added 0.1 gram of platinum oxide catalyst prepared according to the method of Adams, Voorhees and Shriner ("Organic Syntheses," collective volume I, 1932, page 452) and the mixture was shaken on the machine for 96 hours during which time 0.66 mol of hydrogen was absorbed. After this hydrogenation the mixture was acidified with 17 cc. of dilute hydrochloric acid and the platinum catalyst was removed by filtration. The alcohol was evaporated from the filtrate, the residue was then made alkaline with sodium hydroxide and extracted with ether. The ether was removed from the ether extract and the product was distilled. The boiling range of the N-di-n-butylaniline was 265° to 275° C. and 14.5 grams of the product were obtained, which corresponds to a yield of 71%, based on the nitrobenzene. The product was further identified by means of its picrate, which had a melting point of 123° to 125° C. The melting point of the picrate is given as 125° C. by Reilly and Hickinbottom, J. Chem. Soc. of London, 1918, vol. 113, page 99.

*Example XIII.—N-n-di-n-butylaniline using nitrobenzene and acid conditions*

By using 3 grams of Raney nickel catalyst instead of the platinum catalyst in Example XII and 2 grams of trimethylamine hydrochloride instead of the acetic acid, and using 36.9 grams (0.3 mol) of nitrobenzene, so that the ratio of nitrobenzene to butyraldehyde is 1:1, a yield of 63% N-di-n-butylaniline is obtained. (The yield is 98% based on the aldehyde consumed.)

The use of larger ratios of aldehyde in this preparation results in lower yields of the tertiary amine.

*Example XIV.—Tertiary amines using nitro compounds, acid conditions and platinum catalysts*

Adopting the method of Example XII, using glacial acetic acid to provide the acid medium and platinum catalyst and substituting the appropriate aldehyde and nitro compound, the following yields of the respective aliphatic and aromatic tertiary amines were obtained. (Melting points of derivatives used for identification purposes are listed in last column.)

| | | Yield | Derivative and M. P. thereof |
|---|---|---|---|
| 1 | N-diethylaniline | Percent 77 | Picrate, 139–140° C. |
| 2 | N-di-n-propylaniline | 34 | Methiodide, 153–155° C. |
| 3 | N-diethyl-alpha-naphthylamine | 40 | Picrate, 152–154° C. |
| 4 | N-di-n-butylmethylamine | 56 | Hydrochloride, 131.0–131.5° C. Picrate, 86.0–87.5° C. |
| 5 | N-diethylmethylamine | 92 | Picrate, 183–185° C. |
| 6 | N-di-n-propylmethylamine | 45 | Picrate, 92–93° C. |

The properties of the respective amines thus prepared were as follows:

| | | Boiling range | Specific gravity (20°/20° C.) | Refractive index ($n_D^{19}$) |
|---|---|---|---|---|
| 4 | N-di-n-butylmethylamine | 155–163° C. | 0.782 | 1.4302 |
| 6 | N-di-n-propylmethylamine | 110–122° C. | 0.743 | 1.4076 |
| 3 | N-diethyl-alpha-naphthylamine | 155–165° C./30 mm | 1.015 | 1.5961 |

*Example XV.—N-isopropylaniline using acetone and acid conditions*

Substituting acetone for the acetaldehyde used in Example XII in equimolecular amount and proceeding as otherwise therein described, a secondary amine, N-isopropylaniline, instead of a tertiary amine, was obtained in 54% yield. The N-isopropylaniline had a boiling range of 198° to 207° C. and formed a benzamide derivative having a melting point of 63° to 65° C.

*Example XVI.—N-isopropylmethylamine using acetone and acid conditions*

Acetone and nitromethane when reacted according to the procedure of Example XII, produced N-isopropylmethylamine in 59% yield. The product had a boiling range of 45° to 55° C. and was identified as a picrate having a melting point of 133° to 135° C.

*Example XVII.—N-benzyl-N-n-butylaniline using N-benzylphenylhydroxylamine and acid conditions*

By using butyraldehyde and N-benzylaniline in the molecular ratio of 2:1 and hydrogenating in accordance with the procedure described in Example XII, N-benzyl-N-n-butylaniline was obtained in 3% yield, 64% of the N-benzylaniline being recovered unchanged.

A larger and more satisfactory yield (38%) of N-benzyl-N-n-butylaniline can be obtained by reacting butyraldehyde and N-benzylphenylhydroxylamine (which can be prepared by the method of Vavon and Crajcinovic, Compt. rend., 1928, vol. 187, page 420) in the molecular ratio of 2:1 according to the procedure of Example XII, using platinum catalyst and acetic acid in the reaction mixture.

N-benzyl-N-n-butylaniline distills at 175° to 182° C. at a pressure of 10 mm., and has a specific gravity (20°/20° C.) of 1.019 and a refractive index of 1.5810 at 20° C. for the sodium D line. Its picrate had a melting point of 126° to 128° C.

By using sodium acetate instead of acetic acid and Raney nickel catalyst instead of a platinum catalyst, as in Example I, N-benzylphenylhydroxylamine and butyraldehyde in the molecular ratio of 1:2 produced N-benzylaniline in 54% yield without the formation of any quantity of the tertiary amine, N-benzyl-N-n-butylaniline, that could be isolated.

*Example XVIII.—N-n-butylaniline using azobenzene and alkaline medium*

Into a machine for catalytic reduction was placed a solution of 18.2 grams (0.1 mol) of azobenzene, 18.0 grams (0.25 mol) of butyraldehyde and 2 grams of fused sodium acetate dissolved in 150 cc. of 95% alcohol. To this solution was then added about 10 grams of Raney nickel catalyst. From 2 to 40 grams of Raney nickel catalyst give satisfactory results but 10 grams give a smooth and rapid reduction. Hydrogen was passed into the mixture while the machine was shaking until 0.3 to 0.4 mol had been taken up, the period required being approximately 1 to 2 hours. The catalyst was removed by filtration, the filtrate was acidified with hydrochloric acid and the alcohol was evaporated. The product was recovered by making the residue alkaline, extracting the alkaline residue with ether, drying the ether extract over sodium hydroxide and subsequently distillating the extract.

The yield of N-n-butylaniline, a secondary amine, was 71% and the product was identified as the p-bromobenzenesulfonamide which had a melting point of 85° to 86° C.

*Example XIX.—N-n-heptylaniline using azobenzene and alkaline medium*

Substituting an equivalent amount of heptaldehyde for the butyraldehyde of Example XVIII and proceeding as therein otherwise indicated, N-n-heptylaniline was obtained in 74% yield and was identified as the p-bromobenzenesulfonamide having a melting point of 114° to 115° C.

In the case of higher molecular weight amines, such as N-n-heptylaniline, the reaction mixture after hydrogenation need not be acidified before evaporation of the solvent (alcohol).

*Example XX.—N-benzylaniline using azobenzene and alkaline conditions*

By the procedure of Example XVIII, substituting benzaldehyde in an equivalent amount for the butyraldehyde, N-benzylaniline was obtained in 49% yield. The product, N-benzylaniline, was identified as the hydrochloride, having a melting point of 210° to 212° C.

*Example XXI.—N-dimethyl-N'-di-n-butyl-p-phenylenediamine using N-dimethyl-p-aminoazobenzene and alkaline conditions*

Substituting N-dimethyl-p-aminoazobenzene in an equivalent amount for azobenzene and proceeding as otherwise specified in Example XVIII, the products, N-dimethyl-N'-di-n-butyl-p-phenylenediamine in 76% yield and N-n-butylaniline in 73% yield were obtained. The picrate of N-dimethyl-N'-di-n-butyl-p-phenylenediamine has a melting point of 121° to 122° C.

The presence of the amino (or alkyl or dialkylamino) group para to the azo group has an activating influence and instead of getting solely a secondary amine, as would be obtained under alkaline conditions with an unsubstituted azo compound, a tertiary amine is obtained. The activating influence of a hydroxy group is shown in the two next examples (XXII and XXIII).

*Example XXII.—N-di-n-butyl-p-aminophenol using p-hydroxyazobenzene and alkaline conditions*

Substituting an equivalent amount of p-hydroxyazobenzene for the azobenzene in Example XVIII and proceeding as therein otherwise indicated, the tertiary amine, N-di-n-butyl-p-aminophenol, was obtained in 46% yield. The product was isolated as the benzoate by treating the reaction mixture with benzoyl chloride and aqueous alkali.

The benzoate of N-di-n-butyl-p-aminophenol, after recrystallization from acetic acid, has a melting point of 232° to 233° C.

*Example XXIII.—1 - (N - di - n - butylamino) - 2 - naphthol using 1-phenylazo-2-naphthol and alkaline conditions*

Utilizing the procedure of Example XVIII, by substituting 1-phenylazo-2-naphthol for azobenzene in equivalent amount, the tertiary amine 1-(N-di-n-butylamino)-2-naphthol was obtained in 41% yield. The product was isolated by adding water to the reaction mixture after half of the alcohol had been distilled.

1-(N-di-n-butylamino)-2-naphthol has a melting point of 106° to 107° C. and darkens rapidly on standing. It forms a hydrochloride that melts at 225° to 227° C. and which is more stable than the free amine.

The foregoing reactions with azo compounds may also be conducted in acid media to obtain a preponderance of tertiary amines.

*Example XXIV.—N-n-butylaniline using nitrosobenzene and alkaline conditions*

Utilizing the foregoing procedures, N-n-butylaniline was obtained in 45% yield by the reductive alkylation of nitrosobenzene (0.1 mol) and butyraldehyde (0.1 mol) in the presence of Raney nickel catalyst (5 grams) and sodium acetate (2 grams). Aniline is also recoverable from the reaction mixture.

*Example XXV.—N-benzylaniline using nitrosobenzene and alkaline conditions*

Using the foregoing procedures, N-benzylaniline was obtained in 35% yield by the reductive alkylation of nitrosobenzene (0.1 mol) and benzaldehyde (0.1 mol) in the presence of Raney nickel catalyst (5 grams) and sodium acetate (2 grams). From the reaction mixture some aniline is also recoverable.

In the two foregoing examples (XXIV and XXV) the use of nitrosobenzene in the reductive alkylation required larger quantities of catalyst than would be required for the corresponding reduction of nitro or amino compounds and the yields of secondary amines is lower and the product is contaminated with tars. The preparation of secondary amines from aromatic nitroso compounds requires a greater degree of control of the reaction than nitro or amino compounds.

The processes of the invention are applicable to the reductive alkylation of various nitrogen compounds, including aliphatic and aromatic amines such as methylamine, ethylamine, propylamines, butylamines, amylamines, aniline, p-toluidine, p-anisidine, alpha-naphthylamine, beta-naphthylamine, phenylpropylamines (phenylaminopropanes) and the like; aliphatic and aromatic nitro compounds such as nitromethane, nitroethane, nitropropanes, nitrobutanes, nitropentanes, nitrobenzenes, nitrotoluenes, nitrophenols, nitroanisoles, chlorinated nitrobenzenes, nitronaphthalenes, nitronaphthols, nitronaphthylamines, phenylnitropropanes and the like; aromatic nitrosoamines such as nitrosobenzene and the like; and azo compounds such as azobenzene and substituted azobenzenes such as N-dimethyl-p-aminoazobenzene, p-hydroxyazobenzene, 1-phenylazo-2-naphthol and the like. The nitrogen compounds may contain chlorine, alkoxy or aryloxy substituents, for example, chloroaminobenzenes, nitroanisoles, nitrodiphenyloxides and the like, which substituents have no substantial activating influence. However, when amino, hydroxy or alkyl substituents are present, as previously mentioned, the compound is activated as a result thereof.

In the preparation of tertiary amines, N-monoalkylated secondary amines may be used as starting materials, as is obvious, especially when a tertiary amine with two different substituents on the amino nitrogen atom is the desired product. As heretofore mentioned, the presence of activating groups in the nitrogen compounds particularly hydroxy, amino, and substituted amino groups, and particularly those para or ortho to the reacting nitrogen-containing radical, influence the degree of alkylation effected and the ease of the reaction.

Carbonyl compounds which may be used in the reaction include both aliphatic as well as aromatic aldehydes and ketones. Aldehydes are more reactive than ketones, as heretofore mentioned, and ketones in most cases cannot be used to effect alkylation beyond the formation of secondary amines. Examples of aldehydes and ketones which may be used in the processes are formaldehyde, acetaldehyde, propionaldehyde, butyraldehydes, pentaldehydes, hexaldehydes, heptaldehydes, benzaldehyde, acetone, ethyl methyl ketone, diethyl ketone, acetophenone, propiophenone and methyl phenyl diketone and the like. Generally branched-chain or arboraceous aldehydes and ketones do not react as readily as straight-chain compounds. Formaldehyde, as heretofore mentioned, may lead to complications.

Although I have referred to alkylation throughout this specification, it is to be understood that the term when used in the broad sense includes the introduction of aralkyl groups such as is effected by the use of benzaldehyde and the like, as well as alkyl groups. The process of the invention, however, finds its greatest applicability in the case of aliphatic aldehydes whose use in such reactions has not heretofore been possible in a facile manner.

Although I have particularly referred to reaction mixtures containing carbonyl compounds and nitrogen compounds as starting materials, condensation products of the two, or intermediate products of their reductive alkylation may be used.

As hydrogenation catalysts for the reduction, Raney nickel catalysts, platinum black, palladium black and platinum oxide and similar low-pressure hydrogenation catalysts are preferred. Catalysts such as copper chromite are not operative at the low temperatures and pressures contemplated by the present processes. When using acid conditions of reaction, platinum oxide catalysts are preferred to Raney nickel catalysts. With respect to choice of catalyst, it is also to be noted that certain hydrogenation catalysts are more sensitive to chlorine and sulfur compounds than others and hence if the compounds involved in any particular reaction contain halogen or sulfur substituents, proper selection of a catalyst to avoid complications should be made. The proportion of catalyst used for the reaction may be varied over a wide range, as illustrated in certain of the examples.

The alkaline conditions referred to in this specification may be obtained by the use of sodium acetate, sodium propionate, sodium butyrate, sodium stearate, sodium carbonate, and in general, other alkali-metal salts of weak organic acids, as disclosed in my co-pending application Serial No. 370,355 and my application Serial No. 332,975. Sodium hydroxide gives a lower yield of product than sodium acetate and in some cases completely suppresses alkylation, hence is to be avoided. Generally 10 grams to 20 or more grams of fused sodium acetate should be used for each mol of nitrogen compound taking part in the reaction and the yields are not materially changed by the presence of greater proportions. Fused sodium acetate is preferred but it is not essential that the salts used should be anhydrous.

Acid conditions referred to in this specification may be obtained by the use of acetic acid and other weak organic acids, trimethylamine hydrochloride and similar salts of strong (mineral) acids and weak organic bases, containing no alkylatable hydrogen atoms attached to the nitrogen atom, preferably salts of tertiary amines. Mineral acids such as hydrochloric acid and the like cannot be used advantageously. Approximately 30 to 100 grams of glacial acetic acid, for example, to each mol of reacting nitrogen compound should be used.

The reactions may be carried out in various solvents. The examples illustrate the use of 95% ethyl alcohol and dioxane as a solvent but ethyl acetate, methyl alcohol, isopropyl alcohol, isopropyl ether and the like may be used. The essential requisite of the solvent is that it be inert in the reaction and that it dissolve the sodium acetate, trimethylamine hydrochloride or other agent used to facilitate the reaction.

The proportion of reactants in the reaction mixture is not of paramount importance. Generally the carbonyl compound should be in excess of that required by the particular reaction which it is desired to effect.

The temperatures which may be used in the reactions vary from normal room temperatures to approximately 100° C., although the preferred range is about 10° to 40° C. Generally the reaction will proceed without the addition of extraneous heat and with large batches cooling may be desirable to control the reaction. Likewise, the pressures may be varied greatly, for example, from normal atmospheric pressure to 10 or more atmospheres. Preferred pressure conditions, however, are from 2 to 4 atmospheres.

By interrupting the reductive alkylation of aromatic nitrocompounds with aliphatic or aromatic aldehydes according to the present invention at an intermediate stage it is possible to isolate substantial amounts of hydroxylamines. The media may be either acid or alkaline as herein described. These hydroxylamines can be rearranged with acids such as sulfuric acid to give the corresponding aminophenols. Hence, by this procedure I am able to produce substituted hydroxylamines and aminophenols in an advantageous manner. Furthermore, these intermediate products indicate the probable mechanism of reductive alkylation processes according to the invention. Briefly the reactions may be typified by that of nitrobenzene and an aldehyde (RCHO) which may be represented as follows:

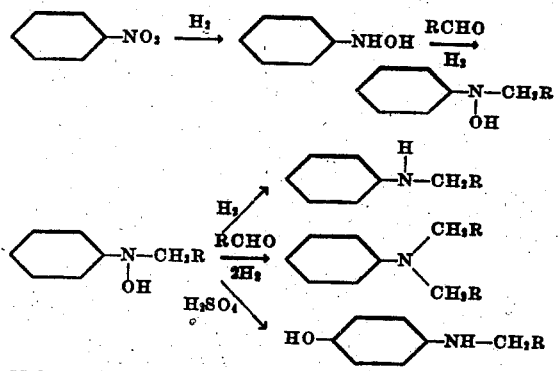

N-benzylphenylhydroxylamine prepared by interrupting the reductive alkylation of nitrobenzene with benzaldehyde, condenses with n-butyraldehyde in an acid medium to give N-benzyl-N-n-butylaniline. The yield is 38% when 2 mols of butyraldehyde are present to each mol of benzylphenylhydroxylamine. (Example XVII.)

As used herein and in the claims the term "weak organic acid" is to be understood to signify monocarboxylic aliphatic acids such as acetic acid, formic acid, propionic acid, butyric acid, dicarboxylic and polycarboxylic acids and the like and to distinguish from strong organic acids such as benzenesulfonic acids and similar non-carboxylic acids and mineral acids.

Inasmuch as the foregoing description comprises preferred embodiments of the invention, it is to be understood that my invention is not to be limited thereto and that modifications and variations may be made therein to adapt the invention to other specific uses without departing substantially from its spirit or scope as defined in the appended claims.

I claim:

1. The process of producing an N-alkylated amine comprising the hydrogenation of a mixture of two compounds, one of which is an organic nitrogen compound selected from the group consisting of primary and secondary aliphatic and aromatic amines, aliphatic and aromatic nitro compounds and aromatic nitroso and azo compounds, and the other of which is a ketone, in the presence of a hydrogenation catalyst and a condensing agent consisting of a weak organic acid.

2. In the method of producing an N-alkylated organic compound by the hydrogenation in the presence of a hydrogenation catalyst of a mixture of two compounds, one of which is an organic nitrogen compound free from hydroxyl and amino substituents and selected from the group consisting of primary and secondary aliphatic and aromatic amines, aliphatic and aromatic nitro compounds and aromatic nitroso and azo compounds, and the other of which is a ketone, the improvement comprising conducting the hydrogenation in the presence of a condensing agent consisting of a weak organic acid at a temperature within the range of approximately 15° to 100° C. and at a pressure of approximately 1 to 4 atmospheres.

3. The process as defined in claim 1 in which the condensing agent is acetic acid.

4. The process as defined in claim 1 in which the hydrogenation catalyst is of the Raney nickel type.

5. The process of producing N-isopropylaniline comprising the hydrogenation of a mixture of acetone and nitrobenzene in the presence of a hydrogenation catalyst and acetic acid at a temperature within the range of approximately 15° to 100° C. and at a pressure of approximately 1 to 4 atmospheres.

6. The process of producing an N-isopropylated aromatic amine comprising the hydrogenation of a mixture of an aromatic nitro compound and acetone in the presence of a hydrogenation catalyst and a condensing agent consisting of acetic acid.

7. The process of producing an N-alkylated aromatic amine comprising the hydrogenation of a mixture of an aromatic nitro compound and an aliphatic ketone in the presence of a hydrogenation catalyst and a condensing agent consisting of a weak organic acid.

8. The process as defined in claim 7 and further characterized in that the condensing agent is acetic acid.

WILLIAM S. EMERSON.